Jan. 12, 1965
S. H. MAVRAKIS
3,164,921
HEATED FISHING ROD
Filed July 9, 1962
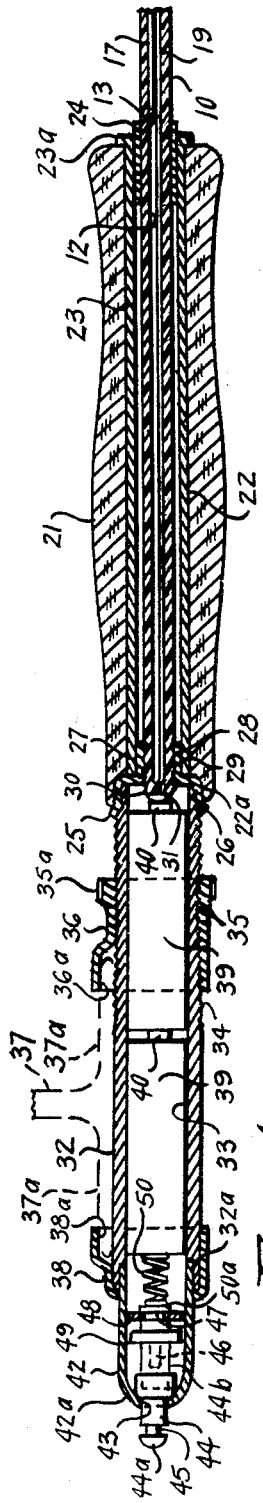
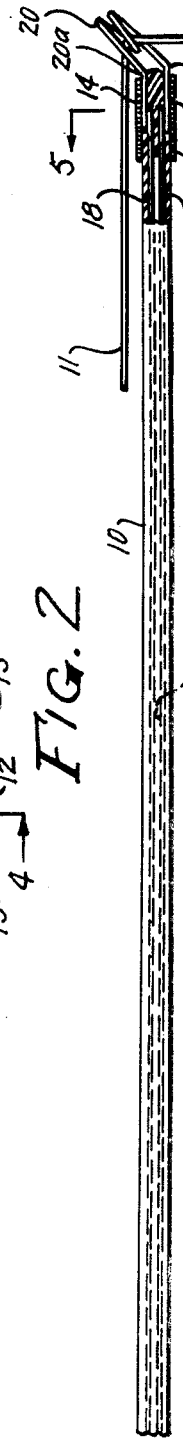
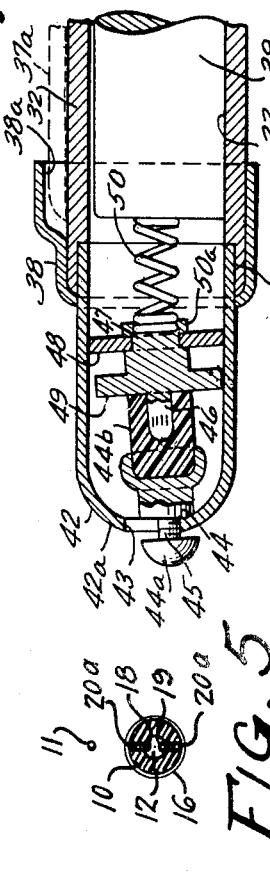
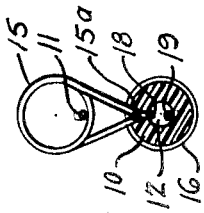
INVENTOR.
SAM MAVRAKIS
BY
Kimmel & Crowell
ATTORNEYS.

United States Patent Office 3,164,921
Patented Jan. 12, 1965

3,164,921
HEATED FISHING ROD
Sam H. Mavrakis, 135 N. Main, Sheridan, Wyo.
Filed July 9, 1962, Ser. No. 208,278
4 Claims. (Cl. 43—24)

This invention relates to an electrical heater for fishing rods and lines.

It is well known that in winter fishing, particularly in fishing through the ice, the fishing line frequently becomes coated with ice, stiff and difficult to handle.

The object of the present invention is to provide an electrical heater which is energized and operated from the grip or handle end of a fishing rod and which will keep the line being payed out or reeled in pliable and free of ice.

Another object of the present invention is to provide an electrical heater for fishing rods which uses the line guides on the rod as the heating elements.

A further object of the present invention is to provide an electrical heater for fishing rods which can be built into the fishing rods at present manufactured with a minimum of modifications of the latter.

Still other objects, advantages and improvements will become apparent from the following specification, taken in connection with the accompanying drawing, in which:

FIGURE 1 is a longitudinal sectional view of the handle or grip of a fishing rod showing the battery power supply and control switch according to the present invention mounted on same;

FIGURE 2 is a side elevational view, partly broken away, showing the intermediate line guide, which forms one of the heating elements, mounted on the rod;

FIGURE 3 is a side elevational view, likewise partly broken away, showing the end line guide, which forms another of the heating elements, mounted on the fishing rod;

FIGURE 4 is a transverse vertical sectional view through the fishing rod, taken on the section line 4—4 of FIGURE 2 and looking in the direction of the arrows;

FIGURE 5 is another transverse vertical sectional view through the fishing rod, taken on the section line 5—5 of FIGURE 3 and looking in the direction of the arrows; and FIGURE 6 is a fragmentary enlarged cross-sectional view through the switch means in the closed position.

Referring now to the drawings in detail and to FIGURE 1 in particular, the reference numeral 10 here designates a fishing rod, which is of the usual hollow interior construction, and the reference numeral 11 designates the usual fishing line. The rod 10 has a longitudinally positioned bore 12 extending throughout its length.

At approximately the mid-section of the rod 10 there is mounted a line guide 15, which receives the line 11. Obviously, there could be more than one said guide 15 at the mid-section. Depending on the length of the rod there could be two to five equally spaced guides along the length of the rod. This line guide is comprised by two or more turns of stiff wire having ends 15a—15a bent in parallel relation to the axis of the coil. The guide is held in place on the rod by wrappings of thread 16—16 as in standard practice in fishing rod manufacture, these being then given a coating of varnish, as is customary, to hold the guides in place on the rod.

Two conductors 17 and 19 extend from the grip end through the bore 12 of the rod. The conductor 17 terminates at the middle line guide 15 extending outwardly through a hole 13 in the wall of the rod, and is electrically connected to one end 15a of the line guide. A third conductor 18 is electrically connected to the other end 15a of the middle line guide, extends inwardly through a second hole 13 in the wall of the rod, and continues through the bore 12 to the outer end of the rod.

The end line guide 20 is mounted at the outer end of the rod, and also receives the line 11. This line guide is also comprised by two or more turns of stiff wire having ends 20a—20a bent at an oblique angle to the transverse plane of the coil and in mutually parallel relation. The parallel ends 20a—20a of the line guide are received in diametrically position grooves 14—14 in the end of the rod 10 and held in place by a banding 16. One end 20a of the line guide has the conductor 18 electrically connected thereto and the conductor 19 is connected to the other end 20a, the conductors 17 and 18 comprising in part the return side of the circuit, to be later described.

A grip 21, preferably of cork, has an axially positioned bore 22 therethrough. In this bore 22 there is force fitted a bushing 23 having a flange 23a at its outer end. A sleeve 24 is in turn force fitted in the bushing 23 at the outer end of the grip and this sleeve receives the rod 10. The conductor 17 extends outwardly through another hole 13 in the wall of the rod and is electrically connected to the sleeve 24 and, through the latter, to the bushing 23.

At its inner end the grip 21 has a counterbore 22a therein. A socket 25 is received in this counterbore 22a. This socket is internally threaded at 26 and has a hollow boss 27 thereon, which is internally threaded at 28.

A base of a flash light bulb is secured to the inner end of the fishing rod in any suitable manner as by brazing. The base is comprised by an externally screw threaded shell 29 and a central contact 31, which is mounted in one end of the shell by a plug 30 of insulating material. The screw threaded shell 29 is received in the internally screw threaded boss 27 on the socket 25 and the conductor 19 is electrically connected to the central contact 31.

A battery casing is comprised by a cylinder 32, which has an axial bore 33 therethrough and which is externally screw threaded at 34 from approximatedly its mid-transverse plane to one end. This latter end is received in the internally screw threaded socket 25. An internally screw threaded locking ring 35 has a knurled ridge 35a thereon and is received on the externally screw threaded section 34 of the battery casing. When this locking ring abuts the inner end of the grip 21, the battery casing is held firmly in position on the end of the grip.

In the battery casing 32 there are at least two dry cells of the type ordinarily used in fountain pen model flash lights. As is well known, such cells are principally comprised by a zinc can 39, which is the negative terminal, and a centrally positioned carbon rod, which is the positive terminal, and which latter is encased at its outer end by a metal cap 40. The zinc cans 39 are covered on their cylindrical walls by heavy cardboard (not shown), which forms an insulating medium. In the series arrangement shown, the metal cap 40 on the central carbon rod of one cell abuts the bottom of the zinc can 39 of the next adjacent cell and the metal cap on the central carbon rod of the latter cell abuts the central contact 31 on the socket.

At its inner end the battery casing 32 is formed with a counter bore 32a in which is received a switch casing 42. The latter is of generally cylindrical shape but has an outer hemispherical end 42a. The switch plunger 44 is slidably mounted in an axial hole 43 in the hemispherical end 42a of the switch casing. This plunger has a hemispherical button 44a at its inner end, a groove 45 therearound adjacent the button 44a and a socket 44b of insulating material. The socket 44b receives one end of a rod 46 forming part of a conductive contact ring 49 having portions 47 secured in a disc 48 of insulating material, the latter element being slidingly received in the switch casing 42. One end of a coiled compression spring 50 abuts the bottom of the innermost cell 37 and the other end seats in a recess 50a in the contact ring 49. The contact ring 49 is normally spaced from the switch casing 42 to preclude energizing the conductors, but when the button 44a is pressed to engage the groove 45 in the hole 43, the switch mechanism is twisted slightly as shown particularly in FIGURE 6 to conductively contact ring 49 with casing 42 and thereby complete the circuitry.

A sleeve 36 has a short arcuate hollow bulge 36a in its wall and is internally threaded and received on the threaded section 34 of the battery casing 32; a complementary sleeve 38 also has a short arcuate hollow bulge 38a in its wall and is forced fitted over the switch casing 42 and the outer end of the battery casing 32. The hollow bulges 36a and 38a on the sleeves 36 and 38, respectively, are aligned and receive the bottom flanges 37a—37a on the line reel 37, which latter is only partially shown and in phantom lines.

In use, the circuit is closed by pressing the semispherical button 44a in the plunger 44 inwardly. The button 44a may be manually held inwardly or may be latched in the closed position by engagement of the annular groove 45 in the plunger with the wall of the hole 43 in the switch casing 42. As the plunger 44 is pushed inwardly, the contact ring 49 on same engages the casing 42. The circuit is now completed and is as follows: From the center terminal 40 on the innermost dry cell 39 to the central contact 31 on the lamp base 29, over the conductor 19, through the end line guide 20, over the conductor 18, through the middle line guide 15, over the conductor 17, through the bushing 24 and sleeve 23 to the socket 25, through the battery casing 32 and switch casing 42, to contact ring 49 of the switch and the compression spring 50 to the bottom of the can of the outermost dry cell 39. The current flowing through the line guides 15 and 20 heats same since the wire inherently resists the current to form heat and the heat is both conducted and radiated to the line 11 to keep same pliable and free of ice. The circuit may be broken at any time by releasing the switch plunger 44 from engagement of the annular groove 45 in same with the edge of the hole 43 in the switch casing 42. The coiled compression spring 50 will then move the plunger 44 outwardly, separating the socket 44b from the contact ring 49 and breaking the circuit at this point.

Having now fully described my invention, what I claim as new and useful and desire to secure by Letters Patent of the United States is:

1. A heated fishing rod having a hand grip at its inner end, a line guide at its outer end, and a line guide at approximately its mid-section, a sleeve within the hand grip receiving the rod, a battery casing having cells therein secured to the inner end of the hand grip and electrically connected to the sleeve, and a circuit from the cells to the battery casing composed by a conductor from one cell to one line guide, a conductor from the line guide to the second line guide, and a conductor from the second line guide to the sleeve, said line guides resisting the current passing therethrough from the cells and thereby being heated.

2. A heated fishing rod having a hand grip at its inner end, a line guide at its outer end, and a line guide at approximately its mid-section, a sleeve within the hand grip receiving the rod, a socket in the inner end of the hand grip and having a hollow boss thereon received within the sleeve, a lamp base on the inner end of the rod received within the boss on the socket, a battery casing having cells therein received in the socket with the center terminal on one cell abutting the central contact on the lamp base, and a circuit comprised by a conductor from the central contact on the lamp base to one line guide, a conductor from the line guide to the second line guide, and a conductor from the second line guide to the sleeve, said line guides resisting the current passing therethrough from the cells and thereby being heated.

3. A heated fishing rod having a hand grip at its inner end, a line guide at its outer end, and a line guide at approximately its mid-section, a sleeve within the hand grip receiving the rod, a battery casing having cells in series relation therein secured at one end to the inner end of the hand grip, and electrically connected to the sleeve, a switch mounted on the other end of the battery casing and electrically connected to one end cell in the series, and a circuit from the other end cell to the first end cell comprised by a conductor from the second end cell to one line guide, a conductor from the line guide to the second guide, and a conductor from the second line guide to the sleeve, said line guides resisting the current passing therethrough from the cells and thereby being heated.

4. A heated fishing rod having a hand grip at its inner end, a line guide at its outer end, and a line guide at approximately its mid-section, a sleeve within the hand grip receiving the rod, a battery casing having cells in series relation therein secured at one end to the inner end of the hand grip and electrically connected to the sleeve, a switch enclosed by a casing mounted on the other end of the battery casing and electrically connected to one end cell in the series, and a circuit from the other end cell to the first end cell comprised by a conductor from the second end cell to one line guide, a conductor from the line guide to the second line guide, a conductor from the second line guide to the sleeve, and the sleeve, battery, and switch casings, said line guides resisting the current passing therethrough from the cells and thereby being heated.

References Cited by the Examiner
UNITED STATES PATENTS

| 2,196,784 | 4/40 | Simmons et al. | 43—17 |
| 2,575,049 | 11/51 | Dean | 43—17 |
| 2,711,044 | 6/55 | Woods | 242—84.1 X |
| 3,045,381 | 7/62 | Martin | 242—84.1 X |
| 3,064,385 | 11/62 | Pickard | 242—84.1 X |

RICHARD M. WOOD, *Primary Examiner*.